(12) United States Patent
Lumsden

(10) Patent No.: US 9,756,842 B1
(45) Date of Patent: Sep. 12, 2017

(54) BAIT FISH CUTTER

(71) Applicant: Steven Grant Lumsden, Boring, OR (US)

(72) Inventor: Steven Grant Lumsden, Boring, OR (US)

(73) Assignee: Steven Grant Lumsden, Boring, OR (US)

( * ) Notice: Subject to any disclaimer, the term of this patent is extended or adjusted under 35 U.S.C. 154(b) by 0 days.

(21) Appl. No.: 15/011,530

(22) Filed: Jan. 30, 2016

(51) Int. Cl.
*A01K 97/04* (2006.01)
*B27G 5/02* (2006.01)

(52) U.S. Cl.
CPC ............ *A01K 97/045* (2013.01); *B27G 5/02* (2013.01); *B27G 5/026* (2013.01); *Y10T 83/695* (2015.04)

(58) Field of Classification Search
CPC . B26B 29/063; B26B 2029/066; Y10T 83/75; Y10T 83/695; B26D 3/30; B26D 7/0006; A47J 47/005; A47J 47/16; B27G 5/026; B27G 5/02; A01K 85/00; A01K 83/00; A01K 97/045; B25B 29/063
USPC ..... 269/289 R, 87.2, 295, 762, 454; D7/673; 83/762
See application file for complete search history.

(56) References Cited

U.S. PATENT DOCUMENTS

| | | | | |
|---|---|---|---|---|
| 2,582,646 A | * | 1/1952 | Moore | A01K 83/06 43/41 |
| 3,171,453 A | * | 3/1965 | Brownrigg | B27G 5/02 83/762 |
| 3,257,725 A | * | 6/1966 | Dignard | B26D 3/00 30/287 |
| 3,465,802 A | * | 9/1969 | Alea | A47J 43/28 30/287 |
| 3,685,191 A | * | 8/1972 | Metzger | A01K 85/14 43/42.05 |
| 3,879,881 A | * | 4/1975 | Vick | A01K 85/16 43/41 |
| 3,935,779 A | * | 2/1976 | Hildebrandt | B27G 5/02 83/762 |

(Continued)

FOREIGN PATENT DOCUMENTS

CN    CH 665165 A5 I    * 1/1984

OTHER PUBLICATIONS

New Presentations on LongLiner (Angler Innovations).*
Sure Spin Bait Cutter Pro (Angler Innovations).*

*Primary Examiner* — Larry E Waggle, Jr.
*Assistant Examiner* — Mahdi H Nejad
(74) *Attorney, Agent, or Firm* — Applied Logic Patents; Andrew B. Levy

(57) ABSTRACT

An apparatus for accurately cutting baitfish at a compound miter angle of forty five degrees. The apparatus automatically centers the bait fish within a transverse well at the bottom of a half pipe tube capable of accommodating various common bait fish sizes. The compound miter cut provided by this apparatus exactly matches the compound miter found within the construction of the Sure Spin Herring Helmet® Angler Innovations. The present apparatus is easily washable and leaves no trace of fish scent between uses as it is constructed from non-absorbing high density polyethylene (HPDE). The apparatus further provides safe usage as downward pressure is applied to the cutting tool and bait fish as the cutting tool blade enters the blade slot groove. The present apparatus is constructed with two half pipe options to accommodate multiple bait fish dimensions.

4 Claims, 3 Drawing Sheets

(56) References Cited

U.S. PATENT DOCUMENTS

| | | | | | |
|---|---|---|---|---|---|
| 3,999,293 | A | * | 12/1976 | Zubrycki | B26B 27/00 30/124 |
| 4,133,132 | A | * | 1/1979 | Ellis | A01K 83/06 43/41 |
| 4,152,963 | A | * | 5/1979 | Romanik | B26B 29/063 83/165 |
| 4,189,132 | A | * | 2/1980 | Di Russo | B26B 29/063 269/295 |
| 4,205,832 | A | | 6/1980 | Kuzio | |
| 4,625,364 | A | | 12/1986 | Adams | |
| 4,685,242 | A | | 8/1987 | Stanish | |
| 4,794,670 | A | | 1/1989 | Savastano, Jr. | |
| 4,948,106 | A | * | 8/1990 | Popeil | B26B 29/063 269/295 |
| 5,191,975 | A | * | 3/1993 | Pezzoli | B65D 71/50 206/151 |
| 6,200,212 | B1 | | 3/2001 | Henry | |
| 6,558,244 | B1 | | 5/2003 | Nedelka | |
| 6,662,699 | B1 | * | 12/2003 | Schmidt | B27G 5/026 83/468 |
| 6,802,149 | B1 | | 10/2004 | Albanese, Jr. | |
| 7,263,798 | B2 | * | 9/2007 | Nichols | A01K 85/18 43/42.09 |
| 9,044,000 | B1 | * | 6/2015 | Lumsden | A01K 83/06 |
| 2011/0304088 | A1 | * | 12/2011 | Lv | B23Q 3/104 269/311 |
| 2013/0026121 | A1 | * | 1/2013 | Thompson | A47J 47/16 211/85.18 |
| 2014/0054836 | A1 | * | 2/2014 | Chen | B26B 29/063 269/288 |

\* cited by examiner

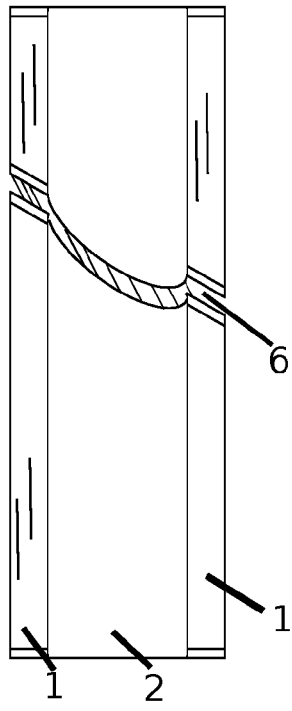
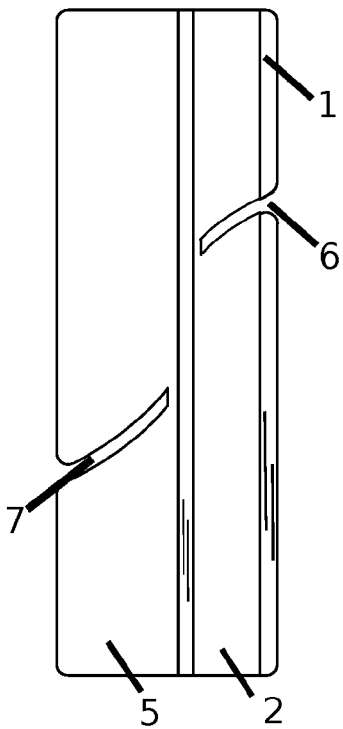
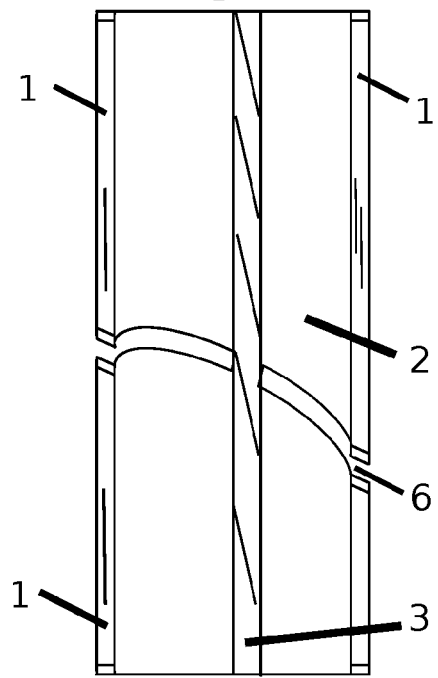

BAIT FISH CUTTER

FIELD OF INVENTION

This invention relates to apparatus for cutting bait fish employing two half pipe tubes fused together with opposing open outer edge lateral sides. In addition, this invention relates to apparatus for holding bait fish in half pipe tubes allowing for automatic centering and ease of use for accurately providing compound miter cuts on bait fish along with safe use for a fisherman.

BACKGROUND OF THE INVENTION

Fishing requires bait and bait is an integral part of a fisherman's requirements. The purpose underlying the present invention is to enable a fisherman to accurately cut a compound miter on a herring bait fish so that the bait fish may have a spinning action or be placed in a Sure Spin Herring Helmet® with perfect alignment of a SureSpin Herring Helmet® to the bait fish. Utilizing the present invention, a fisherman eliminates the risk of accident and creates a perfectly cut bait fish to place into a Sure Spin Herring Helmet®. This invention eliminates the need to hand cut a herring bait fish or even mis-cut the compound miter angle whereby a fisherman would not be able to use the bait fish for its intended purpose and waste a bait fish.

DESCRIPTION OF PRIOR ART

Many bait fish cutting devices have been known for many years. U.S. Pat. No. 4,625,364 is an apparatus for cutting frozen bait fish comprising a cutting head having a plurality of spaced apart cutting blades which are slidably moveable. U.S. Pat. No. 6,200,212 is a compact three-in-one device for cleaning fish, cutting bait with an integral live well, attachable to a boat gunwale. U.S. Pat. No. 6,802,149 is disclosed as a device and method of use for cutting fish into bait pieces. U.S. Pat. Nos. 4,205,832 and 4,253,650 disclose a device for holding bait fish to permit cutting a strip from the side of a fish. U.S. Pat. No. 4,794,670 is a platform for a fish chunk cutting combination enclosed by walls with a pivotally mounted lever carrying blade. U.S. Pat. Nos. 4,685,242 and 6,558,244 are additional apparatus for chopping and making fish into chum of bait size pieces.

All of the prior art for cutting or chunking bait fish were not designed to produce an accurately cut compound miter angle imparting a bait action or for mating the resulting bait fish to a Sure Spin Herring Helmet®. The other bait fish cutting designs were intended for a number of other purposes related to producing multiple pieces of bait size chunks, chum, cleaning fish or live well storage.

OBJECTS AND ADVANTAGES

The main advantage of this invention is that the apparatus produces the effective Sure Spin Herring Helmet® compound miter cut on bait fish every time. Another advantage of the present invention is that the unique half pipe and centering groove well maintain the bait fish in the correct position for a precise cut. The apparatus' material construction allows for easily washable surfaces preventing fish scent migration to other bait fish categories. The apparatus' physical design promotes safe usage by a fisherman. Another advantage for this apparatus is that it is lightweight, and highly durable based on the high density polyethylene (HPDE) material type found in the preferred embodiment.

SUMMARY OF THE INVENTION

Generally speaking, this invention solves the above described problems in the art by providing a bait fish cutting apparatus comprising:
  a first base member comprising a half pipe tube which defines a first cavity well;
  a second base member comprising a narrower width half pipe tube which defines a second cavity well;
  a fused join of a first base member and a second base member where open cavity areas are located on opposite sides;
  where each first base member and second base member have a mitered groove extending across the half pipe at a forty five degree angle.

In the preferred embodiment, the body is comprised of high density polyethylene (HPDE) material.

BRIEF DESCRIPTION OF THE DRAWINGS

FIG. 3 is a bottom planar view of the invention.
FIG. 4 is a right side planar view of the smaller half pipe tube.
FIG. 5 is a top planar view of the smaller half pipe tube.

REFERENCE NUMERALS

Figure 1:
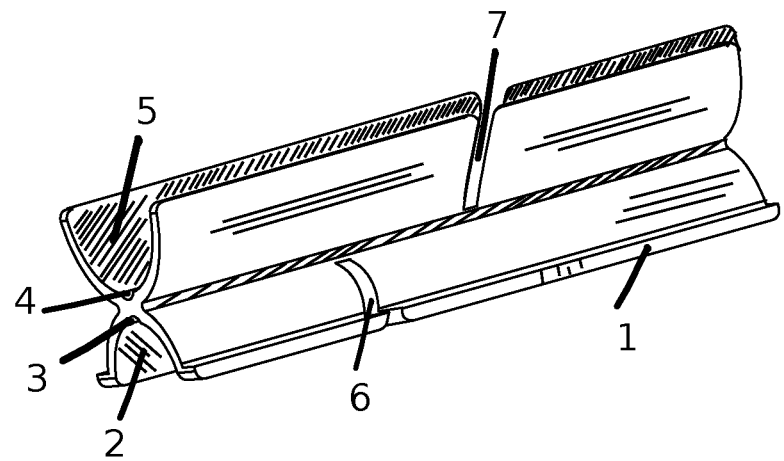
FIG. 1 is a side elevational view of the invention.

1. Small tube support ridge footer
2. Small tube half pipe wall
3. Small tube half pipe channel
4. Large tube half pipe channel
5. Large tube half pipe wall
6. Small tube blade groove guide
7. Large tube blade groove guide
8. large tube support ridge footer

DETAILED DESCRIPTION

The apparatus for accurately cutting bait fish at a compound miter angle of forty five degrees is shown in FIG. 1 with various elements. A small tube support ridge footer 1 is located along the lower edge allows for stability when the large tube half pipe wall 5 is pointed upward. In this orientation the apparatus is ready to hold a larger sized bait fish. The small tube half pipe wall 2 is oriented with its open side downward and not available for holding a smaller sized bait fish. The large tube half pipe channel 4 is facing upward and available to center a larger sized bait fish. The small tube blade groove guide 6 is facing download and not available until the apparatus is flipped over. The large tube blade groove guide 7 is facing upward and is available for use as a compound miter cutting apparatus.

Figure 2:
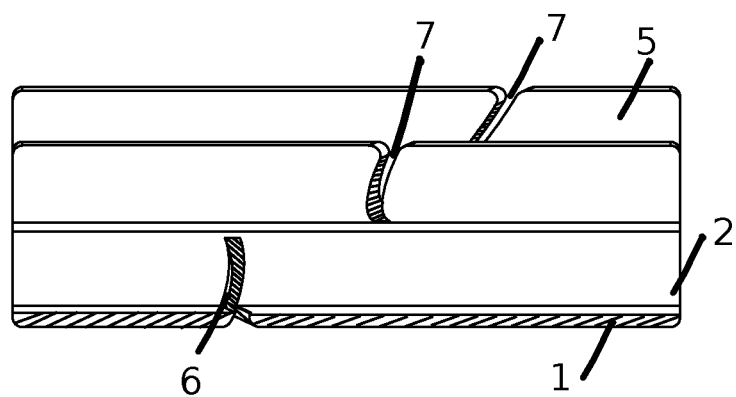
FIG. 2 is a side planar view of the invention.

The apparatus as shown in FIG. 2 shows small tube support ridge footer 1, small tube half pipe wall 2 and small tube blade groove guide 6 elements on the lower half of the diagram. The large tube half pipe wall 5 and the large tube blade groove guide 7 are shown on the upper half of the diagram.

The apparatus as shown in FIG. 3 has small tube support ridge footers 1 on each edge straddling the small tube half pipe wall 2 illustrating small tube blade groove guide 6 located at a compound miter angle of forty five degrees.

The apparatus as shown in FIG. 4 is a side planar view with large tube blade groove 7 and large tube half pipe wall 5 located on the left hand side of the drawing. The right hand side of the drawing illustrates a small tube support ridge footer 1, a small tube half pipe wall 2 and a large tube blade groove guide 6.

The apparatus as shown in FIG. 5 illustrates a concave elevational view of the smaller tube cavity. The outer edge illustrates small tube support ridge footer 1 and small tube blade groove guide 6. Small tube blade groove guide 6 is present to automatically center the bait fish body within the small tube.

Figure 6:
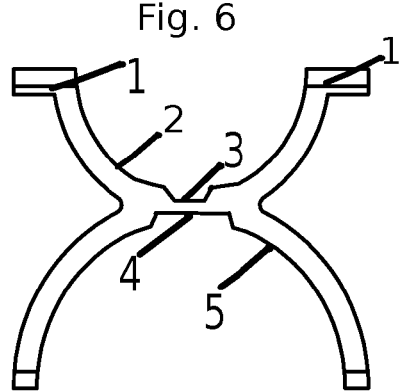
FIG. 6 is a left side planar view with the smaller half pipe tube above.

The apparatus as shown in FIG. 6 illustrates an edge cross sectional view with the smaller tube facing upward. The small tube support ridge footer 1 is shown near the top of the diagram. Small tube half pipe wall 2 is shown above the large tube half pipe wall 5.

Figure 7:
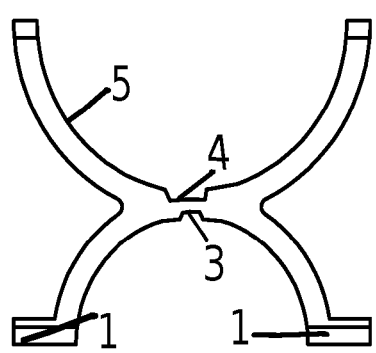
FIG. 7 is a left side planar view with the larger half pipe tube above.

The apparatus as shown in FIG. 7 illustrates an edge cross sectional view with the larger tube facing upward. The large tube half pipe wall 5 faces upward. Small tube half pipe wall 2 is shown below large tube half pipe wall 5, with small tube support ridge footer 1 located at the diagram base.

Figure 8:
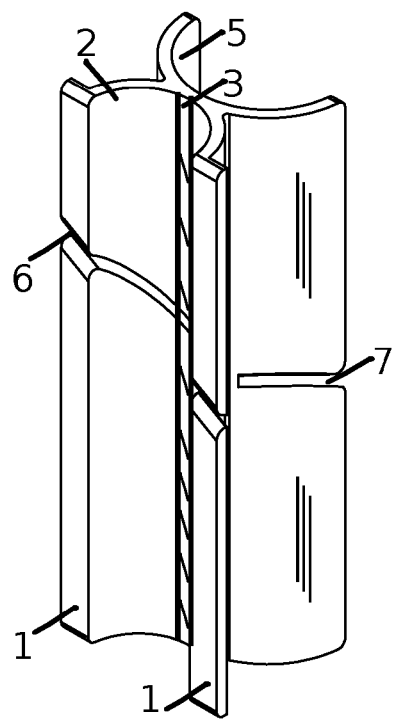
FIG. 8 is an elevational view of the smaller half pipe tube.

The apparatus as shown in FIG. 8 illustrates a vertical elevational view of the smaller tube. Small tube support ridge footers 1 are shown at the diagram base. Small tube blade groove guide 6 is shown along the left side of the diagram. The fisherman would insert a cutting blade into the groove to produce a compound miter cut across the bait fish body resting on small tube half pipe wall 2.

Figure 9:
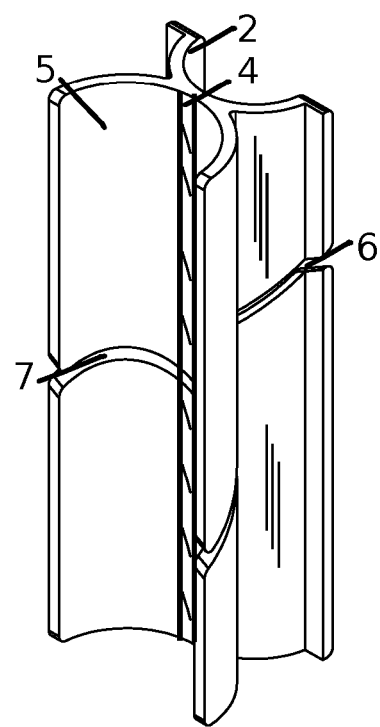
FIG. 9 is an elevational view of the larger half pipe tube.

The apparatus as shown in FIG. 9 illustrates a vertical elevational view of the larger tube. Large tube blade groove guide 7 is shown along the left side of the diagram. The fisherman will insert a cutting blade into the groove to produce a compound miter cut across the bait fish body resting on the large tube half pipe wall 5. Small tube half pipe wall 2 is shown on the under side of the apparatus along with a small tube blade groove guide 6.

What is claimed is:

1. A portable bait fish holder apparatus comprising:
    a first half pipe tubular cutting board having a compound miter groove at a forty five degree angle;
    a second half pipe tubular cutting board having a compound miter groove at a forty five degree angle;
    a fused region where the first half pipe tubular cutting board is fused to the second half pipe tubular cutting board;
    wherein the apparatus has two sides of different diameters accommodating preparation of multiple sized baits;
    wherein a central groove on each of the half pipe tubular cutting boards assists the apparatus with centering and securing a bait fish to be prepared;
    wherein the compound miter groove on each of the half pipe tubular cutting boards providing a knife guide, producing a compound miter cut of forty five degrees on the bait fish;
    wherein each of the half pipe tubular cutting boards has two walls and a base connecting the two walls, the fused region connecting bases of the half pipe tubular cutting boards, making the apparatus a two sided apparatus with a different diameter on each side;
    wherein the central groove being parallel to a length of each of the half pipe tubular cutting boards;
    and wherein each of the compound miter grooves being angled at a forty five degree angle relative to each of the central grooves.

2. The fused cutting board apparatus of claim 1, wherein the fused cutting board is made of high density polyethylene providing a rigid, durable and washable surface.

3. The apparatus of claim 2, wherein the apparatus enables a precision cut of the bait fish to exactly match a compound miter angle of forty five degrees.

4. The apparatus of claim 3, wherein the central groove in each of the first half pipe tubular cutting board and the second half pipe tubular cutting board enabling the bait fish to self center in either the first half pipe tubular cutting board or the second half pipe tubular cutting board.

\* \* \* \* \*